June 9, 1931.  E. E. ELLIS  1,808,919

AUTOMATIC FILM MOVING DEVICE FOR SINGLE EXPOSURE CAMERAS

Filed July 11, 1927   5 Sheets-Sheet 1

Inventor
E. E. Ellis
by
Attorneys

June 9, 1931.  E. E. ELLIS  1,808,919
AUTOMATIC FILM MOVING DEVICE FOR SINGLE EXPOSURE CAMERAS
Filed July 11, 1927  5 Sheets-Sheet 2
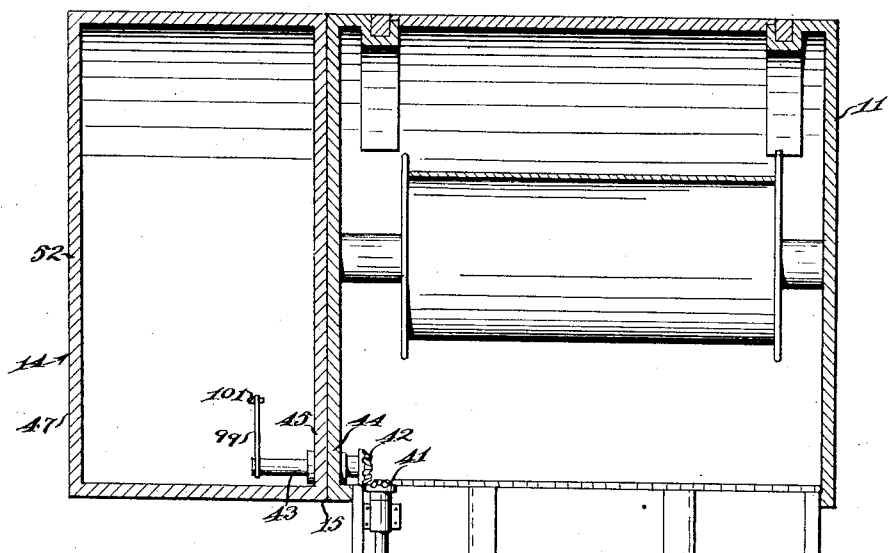
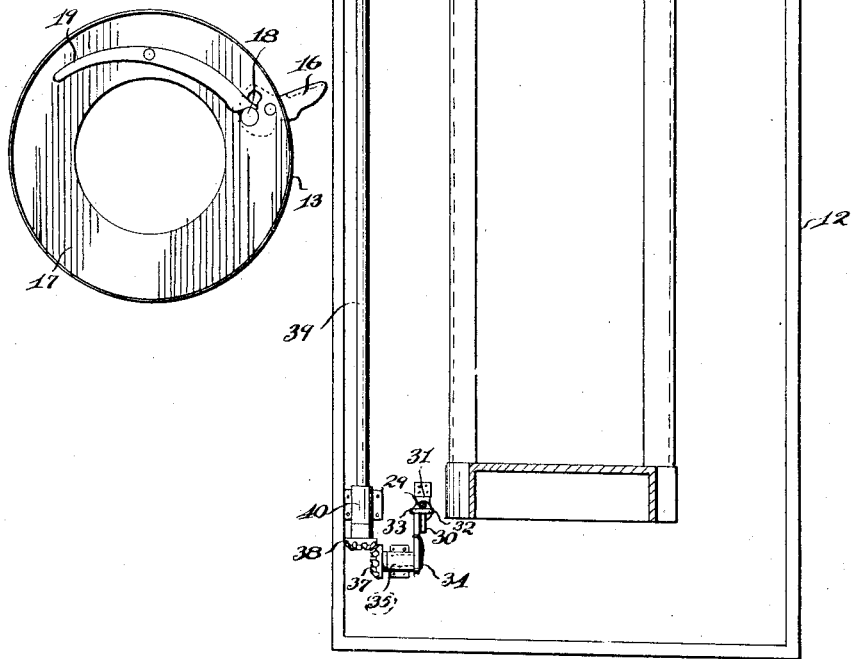

June 9, 1931.  E. E. ELLIS  1,808,919
AUTOMATIC FILM MOVING DEVICE FOR SINGLE EXPOSURE CAMERAS
Filed July 11, 1927    5 Sheets-Sheet 3
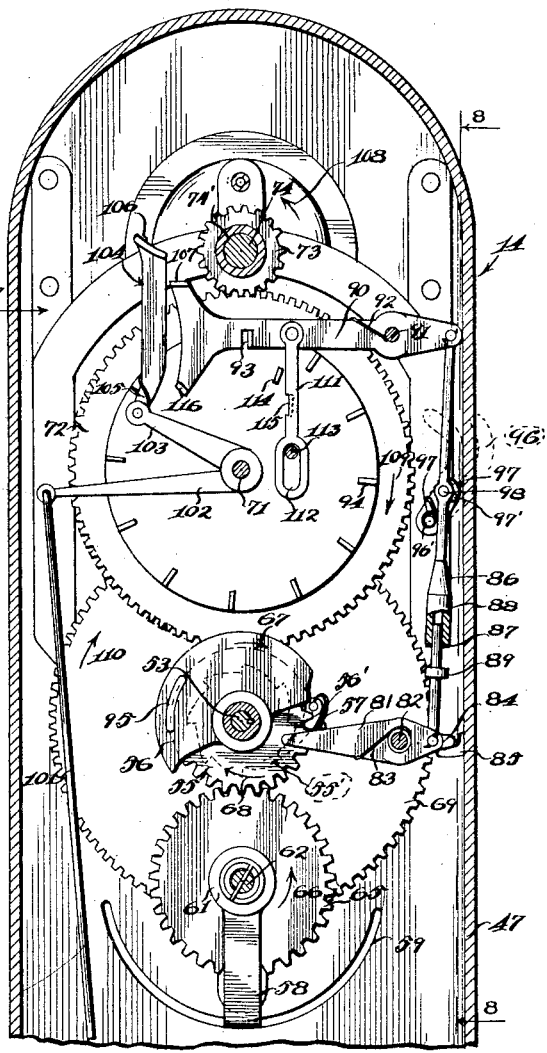

June 9, 1931. E. E. ELLIS 1,808,919
AUTOMATIC FILM MOVING DEVICE FOR SINGLE EXPOSURE CAMERAS
Filed July 11, 1927 5 Sheets-Sheet 4
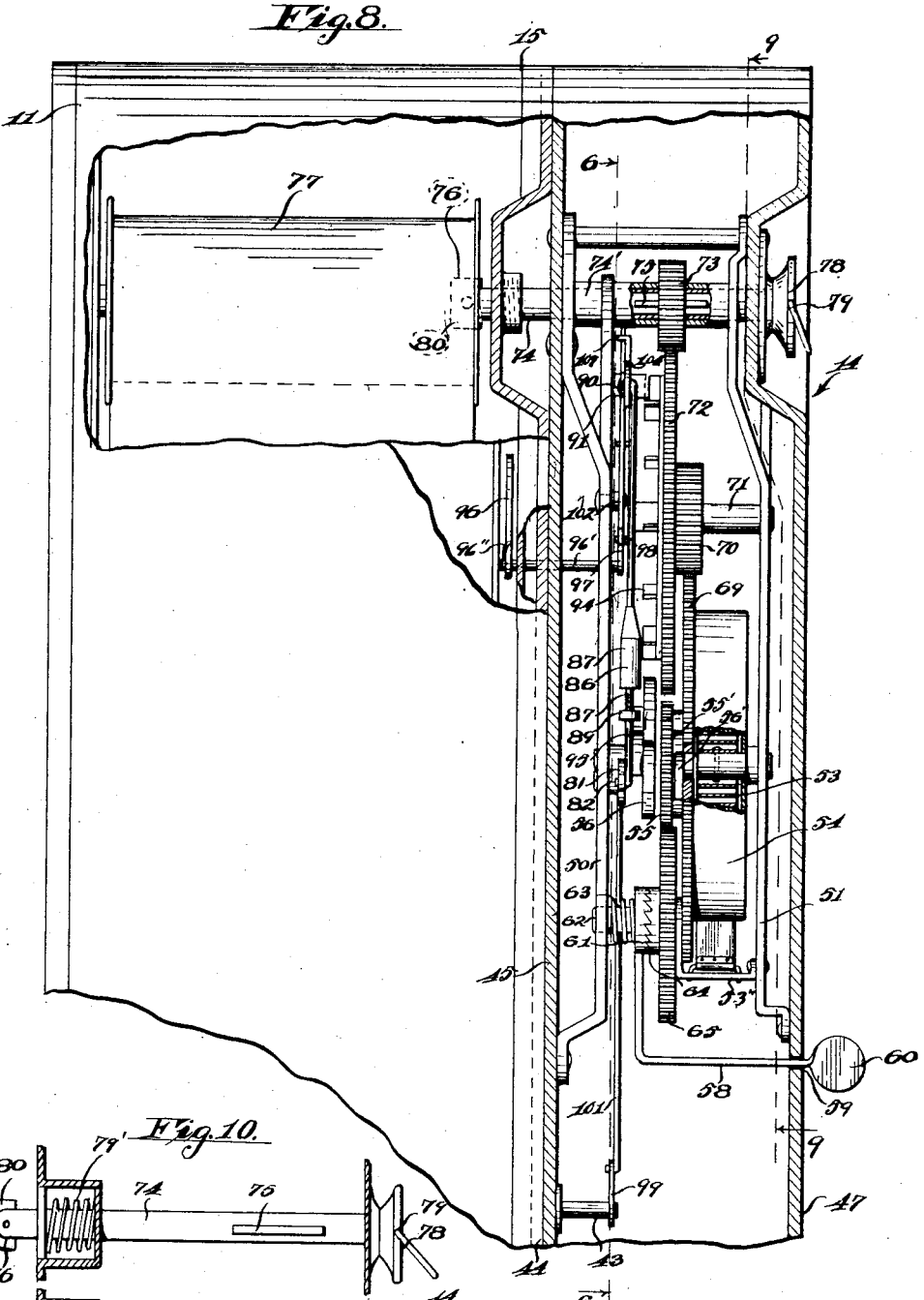
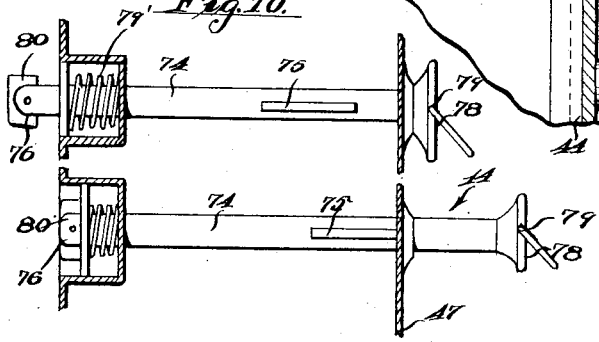
Inventor
E. E. Ellis
by Hazard & Miller
Attorneys June 9, 1931. E. E. ELLIS 1,808,919
AUTOMATIC FILM MOVING DEVICE FOR SINGLE EXPOSURE CAMERAS
Filed July 11, 1927 5 Sheets-Sheet 5

Inventor
E. E. Ellis
by Hazard & Miller
Attorneys

Patented June 9, 1931

1,808,919

UNITED STATES PATENT OFFICE

EDWARD E. ELLIS, OF ALHAMBRA, CALIFORNIA, ASSIGNOR OF ONE-HALF TO OLIVER C. STRATTON, OF SANTA MONICA, CALIFORNIA

AUTOMATIC FILM MOVING DEVICE FOR SINGLE EXPOSURE CAMERAS

Application filed July 11, 1927. Serial No. 204,782.

My invention is an automatic film moving device for single exposure of cameras.

An object of my invention is the construction of a film moving or winding device for cameras which will move the film between exposures and hence allow the rapid taking of a number of successive photographs on the single exposure principle.

Another object of my invention is to insure the positive movement or rolling of the film, after taking a picture, into position for the next exposure to avoid double exposure on the same film.

Another object of my invention is the construction of a device which comes into operation immediately after the closing of the shutter of the camera to move the film and thus position such film for the next exposure.

A further object of my invention is the construction of a device which may be attached to a folding camera so that when the camera is opened and the lens drawn out, the motion initiated by the mechanism closing the shutter actuates or controls a winding mechanism for winding the spool to shift the film from the exposed to an unexposed section of the film.

Another object of my invention is the construction of a spring actuated device for winding the film in a camera and controlling the action of such device on the closure of the shutter to wind the film sufficiently to spool in the exposed section of the film and leave another section ready for a second exposure.

A further detail object is a compensating in the rolling of the film for the increased diameter on the film.

Another object of my invention is an interlocking device between the automatic moving mechanism and the back of the camera, positively locking and preventing movement of the spooling-in mechanism when the back of the camera is removed for placing a new film in the camera, this device requiring rewinding of the spring motor to allow placing the back on the camera.

A further object is the construction of my invention either incorporated in the structure of a specially made camera or as an attachment which may be secured to the side of a camera box having the major portion of the mechanism for the above purpose incorporated therein.

My automatic film moving device may be connected to the shutter actuating mechanism so that as the shutter closes on an exposure, one of the moving bars is retained in a retarded position until the shutter is completely closed and then undergoes the action of the spring controlling the shutter mechanism, and moves a reciprocating rod. This rod is interconnected with a link attached to a lever on the folding front of the camera case and this lever, by intermeshing gears, connects to a rock shaft extending lengthwise of the folding front. A spring and gear case is formed either as an attachment to fit on one edge of the camera or to be incorporated in the camera box, and has a spring motor which is preferably wound by an oscillating action of a lever. A ratchet mechanism allows the spring to be wound up without transmitting motion to the spool for winding in the film. However, when the rock shaft is rotated, this actuates an escapement mechanism which releases one of the train of gears so as to actuate a pinion connected to the spool and after a pre-determined movement, the escapement mechanism is again actuated to stop the rotation of the gear.

The whole mechanism is arranged to operate quickly so that the film is moved into position for a new exposure substantially as fast or faster than a person can take individual photographs, thus allowing taking of a number of exposures in rapid succession.

My invention is illustrated in the accompanying drawings, in which:

Figure 3 is an inside elevation of the face plate over the lens and shutter, showing the release device for taking snap shots.

Figure 5 is a horizontal section through the camera in its open position as if taken on the line 5—5 of Fig. 1 in the direction of the arrows.

Figure 6 is an elevation of the automatic winding mechanism taken on the line 6—6 of Fig. 8 in the direction of the arrows. this being from the camera side.

Figure 7 is a detail elevation of part of the mechanism taken in the direction of the arrow 7 of Fig. 6 showing the escapement device.

Figure 8 is an elevation of the winding mechanism taken on the line 8—8 of Fig. 6 in the direction of the arrows.

Figure 10 is a detail view of the slidable spool winding shaft.

Figure 1:
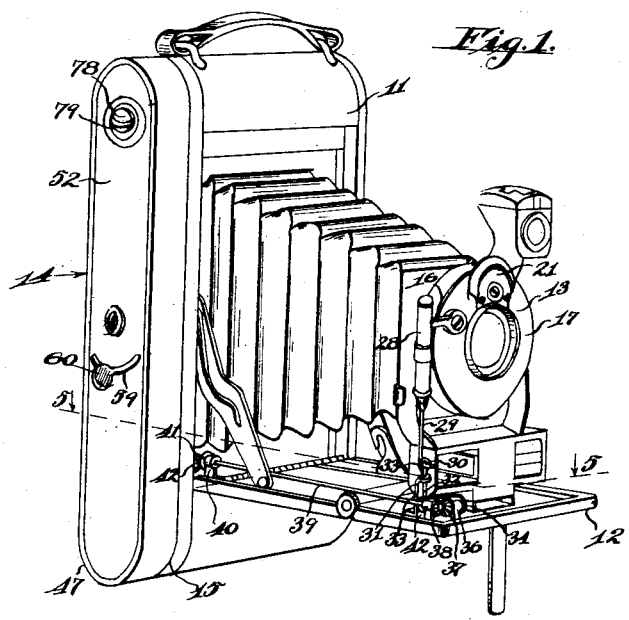
Figure 1 is a perspective view of a camera, a casing attached to one edge to enclose my automatic film moving device, and part of the controlling mechanism associated with the shutter.

The manner of installing my invention on a camera is substantially as follows, having reference particularly to Figs. 1 through 4:

The ordinary camera box is indicated by the numeral 11 having a folding front or board 12 which is hinged in the usual manner so that the lens, shutter and diaphragm device 13 may be housed in the camera box or extended out on the folding front. In the illustration I show my device secured as an attachment designated by the numeral 14 on one edge 15 of the camera box, there being a casing in which the operative parts of the mechanism are housed. In the type of camera illustrated the exposures are taken by operating a finger lever 16 which is mounted on the front cover 17 of the lens, diaphragm and shutter casing. This lever through the medium of a pin 18 actuates an operating lever 19 inside of this cover. It is not necessary to detail completely the shutter operating mechanism, as I connect my device to be controlled by a standard movement. However, it may be stated that the lever 19 engages a pin 20 which transmits the motion from the finger lever 16 to the shutter operating device. The camera has a timing arrangement 21 which forms no part of my invention, and no matter how this is set, either for rapid instantaneous exposures, slow exposures or time exposures, my winding mechanism operates after the closing of the shutter.

In the various links and levers operated in connection with the shutter there is a pivoted lever 22. This lever I modify by placing an elongated projection 23 thereon. This projection engages underneath a complementary projection 24 on the control lever 25. The free end 26 of this lever operates in a slot 27 in a barrel 28 in which there is a link 29 pivotally connected to the end 26 of the lever 25 and extending downwardly has a right angular bend 30 at the bottom.

Figure 2:
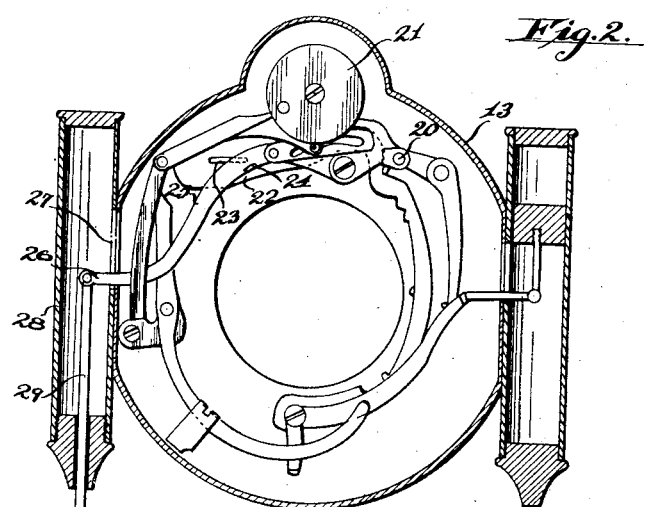
Figure 2 is a front elevation of part of the shutter mechanism with the face plate removed and showing the interconnection between such mechanism and the control of the film moving device.
Figure 4:
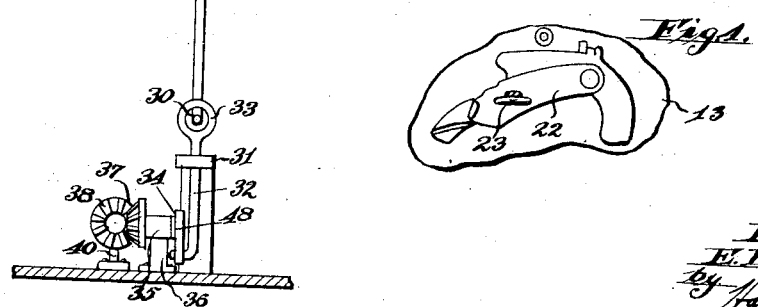
Figure 4 is a detail elevation of one of the moving parts in the shutter control mechanism modified to accommodate my invention.
Figure 9:
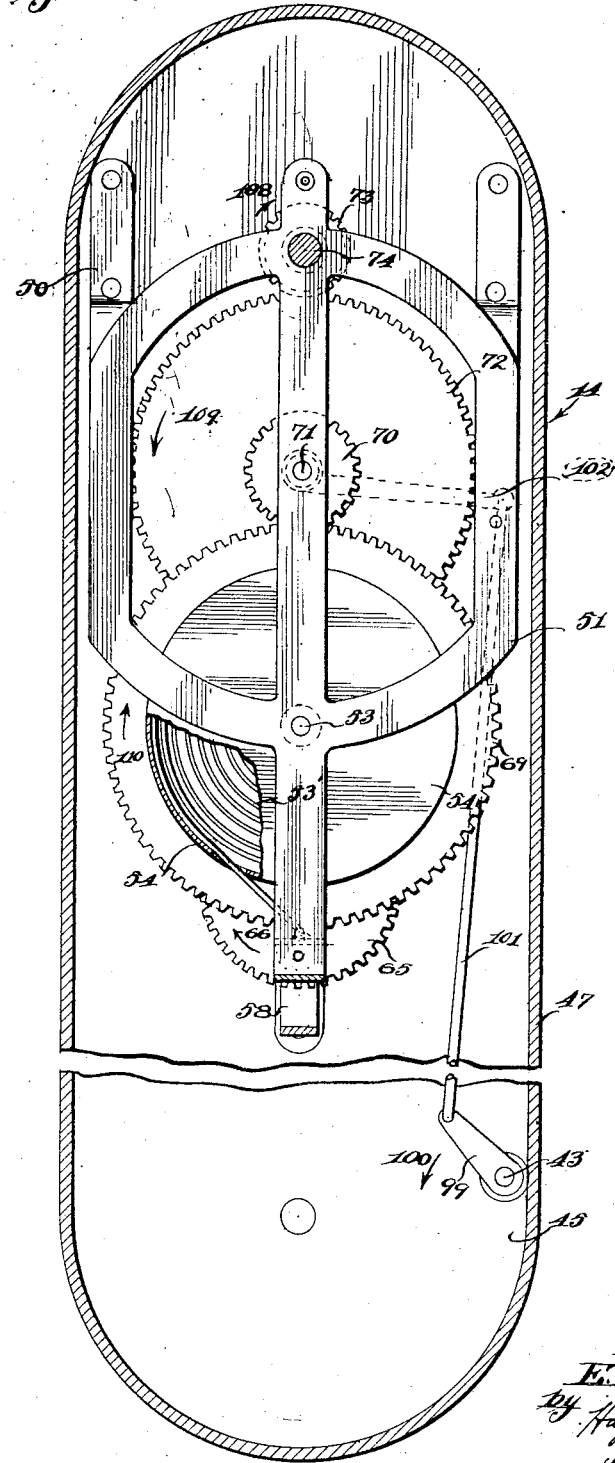
Figure 9 is a section of the winding mechanism taken on the line 9—9 of Fig. 8 in the direction of the arrows.

The motion transmission mechanism from the folding camera front to the attachment is as follows, referring particularly to Figs. 1, 2 and 5:

A bracket 31 is secured on one side of the folding front and has a slide rod 32 mounted therein to slide in a vertical direction when the front is in a horizontal position, this slide rod having an eye 33 in the top. The lower end of this rod is connected to a rock lever 34 which operates a short rock shaft 35 mounted on a trunnion 36. This rock shaft has a beveled pinion 37 which meshes with a beveled pinion 38 on a long rock shaft 39 which is supported on journals 40 adjacent the hinge and the outer end of the folding camera front.

An inner beveled gear 41 on the shaft 39 engages a beveled gear 42 on the transmission rock shaft 43 which is journaled in the wall of the camera box 44 and the inner wall 45 of my attachment casing 47.

The manner of operation of the device so far described is substantially as follows:

When the finger lever 16 is pressed downwardly it actuates the long lever 19 which, operating on the pin 20, actuates the shutter mechanism, and the various links and levers connected thereto, whose movement is controlled by the timing device, are actuated in accordance therewith. This action raises the lever 25 so that the free end 26 travels in the slot 27 to the upper part of the lever 25. The action of drawing up on the barrel 28 pulls upwardly on the link 29 and pulls upwardly on the slide rod 32. There is a spring 48 on the rock lever 34 tensioned to normally elevate this lever, thrusting the slide rod 32 upwardly on the link 29. The bent end 30 of the link 29 and the eye 33 accommodates the focusing of the lens so that no matter what focus this is adjusted to, the hook end will always engage in the eye 33.

In the action of the shutter mechanism the pivoted lever 22 has substantially a rectilinear motion, while the lever 25 has an arcuate motion. In the return motion of the pivoted lever 22, after the shutter closes, the projection 23 on the pivoted lever 22 engages the projection 24 on the lever 25 and retains this lever in its elevated position until the shutter is completely closed, when these projections disengage and allow the lever 25 to move downwardly, and in this action it is impelled by a spring in the shutter mechanism. The downward movement therefore of the lever 25 gives a similar movement to the link 29, the slide rod 32, and by means of the beveled gears and the pivoted arm gives a rock motion to the shaft 43.

The spring motor and the winding mechanism in the attachment of the camera is substantially as follows, having reference particularly to Figs. 6 through 9:

A suitable back frame 50 is secured to the wall 45 of the casing 47 and a front frame 51 is secured to the outside wall 52 of the casing 47. There is a spring winding shaft 53 which is journaled to the frames 50 and 51. This shaft has a spring 53' connected thereto, the outer end of the spring being secured to a bar 53'' connected to the frame 51 and enclosed in a casing 54. There is a gear 55, a ratchet 55' and a segmental plate 56 keyed to the shaft 53. A pivotal pawl 56' is carried by a large gear 69 and a spring 57 presses the pawl against the ratchet 55'.

A winding motion is transmitted as follows:

A winding lever 58 projects through an arcuate slot 59 in the outside wall 52 of the casing 47 and has a finger engaging end 60 on the outside. This lever has a ratchet 61 which is loosely mounted on a stud 62 secured to the back frame 50, this ratchet being normally pressed outwardly by a spring 63. The ratchet 61 engages a complementary ratchet 64 which is preferably formed integral with a transmission gear 65 mounted on the stud 62. This gear meshes with the gear 55. As it can only rotate in one direction under the action of the winding lever 58, this being in the direction of the arrow 66, the gear 55 is rotated in the direction of the arrow 68, the segmental plate 56 is rotated in the direction of the arrow 67, and this, by means of the pawl 56', transmits motion in the direction of the arrow 68 to the ratchet 55', thus winding the spring 53'. It is to be understood that the casing 54 is held stationary in this operation by mechanism hereunder set forth.

The transmission of power from the spring motor to the spool is substantially as follows, having reference particularly to Figs. 6 through 9:

On the shaft 53 and driven by the pawl and ratchet there is a large gear 69 which rotates loosely on the shaft 53 and this meshes with a pinion 70 on a stud 71 secured to the front frame 51. Connected to the pinion 70 there is a transmission gear 72 which engages a pinion 73 mounted on the sliding spool winding shaft 74 having a sleeve 74' engaging the frame and the pinion 73 to retain such pinion in proper position. The pinion 73 is secured to the winding shaft by a key 75. This shaft is journaled in the frames 50 and 51 and at its inner end 76 engages the spool 77, this end being of a proper construction to engage the spool. On the outside of the attachment the shaft 74 has a head 78 with a wire loop 79, so that the spool may be manually wound when desired.

When the casing 47 is attached to a camera, the winding shaft 74 is substituted for the ordinary winding device on the camera and the spring 79' in the casing of the camera normally tends to thrust the spool engaging device 80 into engagement with the spool. This may be disengaged from the camera by removing the head 78.

In connection with the spring motor winding mechanism I use an interlocking device preventing turning of the spool, and also preventing placing the back of the camera before the spring motor is wound, this construction being substantially as follows, referring particularly to Figs. 6 and 8:

A lever 81 is mounted on a stud 82 connected to frame 50 and having a spring 83 normally holding this lever in the position shown in Fig. 6. A rearward extension 84 of the lever engages a stop lug 85 on the casing 47, limiting the motion. A telescopic link 86 is connected to the lever 81, this having an inner rod 87 sliding in a weighted socket 88 in the upper part of the rod, and there is a collar 89 on the lower rod engaging the base of the socket. The upper end of the telescopic link is connected to a latch lever 90 which is mounted on a stud 91 connected to the frame 50, and this latch lever is pressed normally downwardly as in the position of Fig. 6, by a spring 92. The lever has a notch 93 which engages laterally projecting teeth 94 on the gear 72, and thus when in the position shown prevents rotation of the film spool.

The segmental plate 56 has a lateral projection 95 which, when the motor spring is being wound, rotates with the gear 57 in a clockwise direction and comes in contact with one end of the lever 81.

This action locks the lever, bringing the collar 89 into engagement with the lower end of the socket on the upper end of the telescopic link 86 and positively moves the latch lever 90 into its downward position, as shown in Fig. 6. This lever has a lifting motion, as hereunder described, being part of the escapement mechanism hereunder described.

The positive stop to prevent placing the back on the camera comprises an angularly bent dog 96 mounted on a rock shaft 96' journaled in the frame 50 and the walls 44 and 45 of the camera and the casing, and has a spring 96'' normally tensioned to rock said dog outwardly. This rock shaft 96' has a lever 97 with a slot 97' in which fits a stud 98 secured to the upper part of the telescopic link 86. When the back of the camera is removed the dog 96 is forced downwardly and outwardly into the outer dotted position, due to the action of the spring 96″, and such movement carries the lever 97 with it, this lever drawing downwardly on the latch lever 90 and holding the latch lever down until the spool is turned into position for a refill, as hereunder described.

After the camera is reloaded the spring motor may be wound and the transmission of motion to the spool is prevented as hereunder described. In the action of winding the spring motor the lateral projection 95 on the plate segment 56 engages the lever 81 and forces this downwardly at the long end, raising the short end and bringing the collar 89 into engagement with the lower end 87 of the telescopic link 86. This action, elevating this link, raises the lever 97 through the movement of the stud 98 in the slot 97′, thereby rocking the dog 96 through the medium of the rock shaft 96′ from the lower dotted position to the upper dotted position of Fig. 6, thus allowing replacing of the back on the camera.

The movement for winding the spool by the power of the spring motor is controlled by an escapement mechanism constructed substantially as follows, having reference particularly to Figs. 6, 7, 8 and 9:

As above described, a rocking motion is conveyed to the shaft 43 (see Fig. 5) by the motion of the rock shaft 39, due to the pressing of the shutter release 16, as above described. This motion pulls the rock lever 99 downwardly in the direction of the arrow 100, drawing down on the link 101 which is connected to the long end of the bell crank 102, this crank being pivoted on the stud 71. The upper end 103 of the bell crank is connected to a latch bar 104 which has a spring 105 normally holding this bar in the position shown in Fig. 6; but on downward movement of the bar, the laterally bent end 106 engages under the lug 107 bent laterally from the latch lever 90 (Figs. 6 and 7).

After the shutter closes, in taking an exposure, the motion of the rock lever 39, hence the shaft 43, is reversed and the rock lever 99 is reversed in the direction of movement. This action causes the latch bar 104 to move upwardly, lifting the latch lever 90 by the interengagement of the lugs 106 and 107, so that the notch 93 is released from a projecting tooth 94. Hence the spring motor may operate, and this causes the pinion and spool to rotate in the direction of the arrow 108, the gear 72 rotating in the direction of the arrow 109 and the gear 69 in the direction of the arrow 110, this gear being actuated from motion transmitted by the shaft 53 through the medium of the ratchet 55′ keyed thereon and the pawl 56′. The casing 54 is held stationary on account of the spring extending through a slot in its periphery, and is merely a spring cover.

In the elevation of the latch lever 90, this lever draws upwardly on suspended bar 111 pivotally connected thereto, this bar having an eye 112 which loosely engages a stud 113 mounted on the frame 50. When this bar is in its upward position it engages a projecting stop pin 114 and an inwardly projecting lug 115 on the bar and stops the rotation of the gear 72 and hence the spool. There is only one stop pin 114 on the gear 72 and this is arranged so that it engages the lateral lug 115 at the zero or number 1 position of the spool, that is, in position for re-charging the camera, as above described, in connection with the replacing of the camera back. After the camera back is replaced and the dog 96 raised in the upper position shown in Fig. 6 and the spring is re-wound, the first movement of the motor spring in unwinding actuates the spool slightly, this being sufficient to remove the projection 95 from the lever 81, allowing such lever to return to the position shown in Fig. 6. In this case the latch lever 90 is allowed to drop so that the elements 114 and 115 disengage and thereby the first or number 1 tooth 94 engages in the notch 93. The film is therefore in proper position on the spool and in the camera for the first exposure.

After each exposure, during the elevation of the latch lever 90 by the interconnection of the lugs 106 and 107 and due to the movement of the latch bar 104, the laterally projecting lug 116 on the latch lever 90 engages the side of the latch bar 104, releasing the lugs 106 and 107. This causes the latch lever 90 to drop and the notch 93 engages the next lateral tooth 94 on the gear 72 from that from which it has been released. This motion of the gear 72 and hence the pinion 73 is sufficient to wind the spool, shifting the film to a new position for exposure. These teeth 94 are positioned equidistant around the gear 72 to allow fixed lengths of film to be wound at each stop.

A feature of my invention in the connection from the shutter mechanism to the attachment is that this allows the closing of the front of the camera and the folding inwardly of the bellows connected to the lens and shutter structure. On account of the meshing of the beveled gears 41 and 42 this front 12 may be folded upwardly, the one gear pivoting around the other. While the construction is suitable for a camera with a folding front and a bellows, it may also be used for a camera having an extensible bellows and without the folding front feature.

A feature of my invention is that the rewinding spring motor is controlled by the actuating mechanism for the shutter in contradistinction to the release or the control mechanism for the shutter. The prior practice in which the device for releasing the shutter also controls the spring motor for winding the film or in some other manner controls or actuates the movement of the film is open to objection in that such movement of the film may possibly take place before an exposure is completed, especially when the exposure must be a time exposure. But with my construction the shutter actuating mechanism itself is the medium for controlling the spring motor for winding the film, and no matter whether the exposure is instantaneous or time, the shutter actuating mechanism completes the closure of the shutter before the film can be moved.

Various changes may be made in the principles of my invention without departing from the spirit thereof, as set forth in the description, drawings and claims.

I claim:

1. In the art described, the combination of a camera having a spool to wind a film thereon, a shutter mechanism and a removable back, a spring motor, a drive train from the motor to rotate the spool, a winding mechanism for the motor, an escapement mechanism for the said drive train, means preventing replacement of the back until actuation of the winding mechanism, said means interacting with the escapement, means controlled by the starting of the shutter actuating mechanism to engage the escapement means controlled by the shutter actuating mechanism after the closing of the shutter to release the escapement and allow rotation of the spool by the spring motor.

2. In the art described, the combination of a camera having a spool to wind a film thereon, a spring motor, a power transmission mechanism from the motor to rotate the spool, manual means to wind the motor, an escapement mechanism having a pivoted latch lever and a slidable latch bar, said latch lever engaging with the power transmission to retain same stationary while the motor is being wound, means to interengage the latch bar and the latch lever, the latch bar actuating the latch lever to disengage same from the power mechanism means actuated by the latch lever to disengage the latch bar, and means to retain the latch lever into engagement with the power mechanism.

3. The combination with a camera having a spool to wind a film thereon, of a spring motor, a gear train from the motor to the spool to rotate the spool, a manual winding mechanism for the motor, one of the train of gears having a series of stop teeth, a pivoted latch lever to engage said teeth, a link secured to said latch lever, means interengaging the link and the winding mechanism to retain the latch lever in engagement with one of the teeth during the winding of the motor, a latch bar, means to interengage the latch bar and the latch lever, means to actuate the latch bar to release the latch lever from one of the stop teeth and allow operation of the train of gears, said latch lever disengaging the latch bar and means to return the latch lever into engagement with one of the stop teeth.

4. A camera as claimed in claim 3, a ratchet wheel interconnected to the spring motor, a gear interconnected to the winding mechanism, a segmental plate connected with the gear, a pawl on the gear engaging the ratchet, a pivotally mounted lever connected to the link, said lever being actuated by a projection from the segmental plate on winding of the spring motor to actuate the link in one direction.

5. The combination with a camera having a spool to wind a film thereon, and a removable back, of a spring motor, a train of gears from the motor to the spool to actuate the spool, a dog pivotally mounted to prevent replacing of the back, a winding mechanism for the motor, means to actuate the dog on winding of the motor to shift same to allow replacing of the back and means to control the spring motor to wind the spool.

6. A camera as claimed in claim 5, the camera having a shutter and a shutter actuating mechanism, the means to control the motor to rotate the spool having an interconnection with the shutter mechanism to rotate the spool after closing of the shutter.

7. The combination with a camera box having a spool to wind a film thereon, a folding front having a lens with a shutter and a shutter actuating mechanism, of an attachable casing connected to the box having a shaft to engage the spool, a spring motor, a power drive from the motor to the shaft to rotate the spool, a system of rock shafts and rock levers connected to the folding front, an escapement mechanism for the power drive, means interconnecting the said system of rock shafts and levers with the escapement mechanism, and means actuated by the operation of the shutter actuating mechanism to operate the system of rock shafts and rock levers.

8. A camera as claimed in claim 7, the casing having a manually operated means to wind the spring motor, and means actuated by the winding of the motor to render inactive the escapement mechanism and prevent rotation of the spool.

9. A camera as claimed in claim 7, the camera having a removable back, a stop means actuated by the removal of the back to move outwardly and prevent replacement of the back, a winding mechanism in the casing and means actuated by the winding mechanism to operate the stop means to allow replacement of the back.

10. In combination with a camera box having a shutter, a pivotally mounted lever forming part of the shutter actuating mechanism adapted to be released by a release device, a control lever shiftably mounted, interengaging means between the pivoted lever and the control lever, a link connected to the control lever, and a system of rock shafts and gears operated by the link, said rock shafts and gears being adapted to control a rewind mechanism for the camera film.

11. In a camera having a folding front board, a shutter adjustably mounted thereon having a shutter actuating mechanism with means to release such mechanism, a rock shaft extending longitudinally of the board, a gear connection at the inner end of the shaft connecting with an operative mechanism in the camera, and an interconnection between the shutter actuating mechanism and the other end of the shaft to operate the shaft, the mechanism in the camera being adapted to control a film shifting device.

12. In a camera as claimed in claim 11, the interconnection of the shutter actuating mechanism and the shaft having a pivotally mounted lever with a projection thereon, a control lever with a second projection, the said projections being adapted to interengage and operate the control lever by the movement of the pivoted lever, a link connected to the control lever, the said link interacting with the said rock shaft to rotate the shaft on the operation of the control lever.

In testimony whereof I have signed my name to this specification.

EDWARD E. ELLIS.